United States Patent
Quan et al.

(10) Patent No.: US 12,225,636 B2
(45) Date of Patent: Feb. 11, 2025

(54) SELF-REGULATING CARBON FIBER COMPOSITE PLANAR ELECTROTHERMAL MATERIAL AND MANUFACTURING METHOD THEREFOR

(71) Applicant: Shanghai Junhui New Materials Technology Co., Ltd., Shanghai (CN)

(72) Inventors: Juncheng Quan, Shanghai (CN); Chuonan Wang, Shanghai (CN); Yumei Ma, Shanghai (CN); Shouzhi Quan, Shanghai (CN)

(73) Assignee: Shanghai Junhui New Materials Technology Co., Ltd., Shanghai (CN)

(*) Notice: Subject to any disclaimer, the term of this patent is extended or adjusted under 35 U.S.C. 154(b) by 0 days.

(21) Appl. No.: 18/786,409

(22) Filed: Jul. 26, 2024

(65) Prior Publication Data

US 2024/0389198 A1    Nov. 21, 2024

Related U.S. Application Data

(63) Continuation of application No. PCT/CN2023/107118, filed on Jul. 13, 2023.

(30) Foreign Application Priority Data

Jul. 15, 2022 (CN) .......................... 202210831673.6

(51) Int. Cl.
*H05B 3/14* (2006.01)
*H05B 3/34* (2006.01)

(52) U.S. Cl.
CPC ............... *H05B 3/141* (2013.01); *H05B 3/34* (2013.01)

(58) Field of Classification Search
None
See application file for complete search history.

(56) References Cited

U.S. PATENT DOCUMENTS 4,400,614 A * 8/1983 Sopory ................. B29C 48/156
264/105
4,833,305 A * 5/1989 Mashimo ............... H05B 3/146
219/548

(Continued)

FOREIGN PATENT DOCUMENTS

CN           1799831 A     7/2006
CN         102291858 A    12/2011

(Continued)

OTHER PUBLICATIONS

PCT International Search Report mailed Sep. 8, 2023 in PCT/CN2023/107118, pp. 1-2.

*Primary Examiner* — Thor S Campbell
(74) *Attorney, Agent, or Firm* — Mei & Mark LLP; Manni Li

(57) ABSTRACT

A self-regulating far-infrared carbon fiber composite planar electrothermal material and manufacturing method therefor, where the material is composed of two reinforced insulating layers, two insulating layers, two self-regulating layers and a heating layer, is formed by high-temperature hot pressing, impregnation and curing, and further comprises a connecting terminal and a power supply lead. The connecting terminal is riveted on copper electrodes at two ends of the self-regulating far-infrared carbon fiber composite planar electrothermal material, and the power supply lead is snap-fitted on a wiring groove of the connecting terminal. The electrothermal material uses a three-dimensional conductive network with a stable physical structure of carbon fiber conductive paper, which effectively avoids unstable heating performance, short service life, and fire hazards that may be caused in the self-regulating planar heating material.

10 Claims, 1 Drawing Sheet

(56) References Cited

U.S. PATENT DOCUMENTS

| | | | | |
|---|---|---|---|---|
| 6,197,220 B1 * | 3/2001 | Blok | ............... | H01C 7/027 |
| | | | | 252/514 |
| 9,210,739 B2 * | 12/2015 | Chabach | ............... | H05B 3/0014 |
| 11,686,502 B2 * | 6/2023 | Kachelhoffer | ........ | F24H 9/1872 |
| | | | | 219/202 |
| 2015/0040937 A1 * | 2/2015 | Yang | ............... | A45D 19/16 |
| | | | | 132/271 |
| 2015/0376353 A1 * | 12/2015 | Takebe | ............... | C08J 5/042 |
| | | | | 428/161 |
| 2018/0264788 A1 * | 9/2018 | Sunagawa | ............... | C09J 133/14 |
| 2018/0347117 A1 * | 12/2018 | Fushimi | ............... | D21H 27/36 |
| 2020/0355866 A1 * | 11/2020 | Hattori | ............... | H01L 33/60 |
| 2021/0048575 A1 * | 2/2021 | Rinko | ............... | G02B 6/0036 |
| 2023/0054505 A1 * | 2/2023 | Lee | ............... | H05B 3/347 |
| 2023/0062801 A1 * | 3/2023 | Hoshino | ............... | C08L 101/02 |
| 2024/0308182 A1 * | 9/2024 | Heintz | ............... | B32B 5/022 |

FOREIGN PATENT DOCUMENTS

| | | |
|---|---|---|
| CN | 210042264 U | 2/2020 |
| CN | 111925686 A | 11/2020 |
| JP | H0945466 A | 2/1997 |

\* cited by examiner

SELF-REGULATING CARBON FIBER COMPOSITE PLANAR ELECTROTHERMAL MATERIAL AND MANUFACTURING METHOD THEREFOR

CROSS-REFERENCE TO RELATED APPLICATIONS

The subject application is a continuation of PCT/CN2023/107118 filed on Jul. 13, 2023, which in turn claims priority to Chinese patent application no. CN 202210831673.6 filed on Jul. 15, 2022, in China. The contents and subject matters of the PCT international stage application and the Chinese priority application are incorporated herein by reference.

TECHNICAL FIELD

The present invention relates to an electrothermal material, in particular, to a self-regulating far-infrared carbon fiber composite planar electrothermal material and method for manufacturing the same.

BACKGROUND

In the market, carbon fiber composite planar electrothermal materials generally use carbon fiber composite conductive paper as the heating carrier. The conductive paper mainly uses a three-dimensional conductive network built by short carbon fiber, and its conductive network is a network formed by physical construction. The composite electrothermal materials have an ultra-long service life and excellent infrared performance: the electrothermal conversion efficiency is high, and the electrothermal radiation conversion efficiency can generally reach 60% or above. Carbon fiber composite planar electrothermal materials are widely used in floor heating, rehabilitation and physiotherapy, food drying, sterilization, wearing devices, household appliances, and other fields.

Chinese patent application publication CN102291858A discloses a low-temperature composite electrothermal material and manufacturing method therefor, where the low-temperature composite electrothermal material is formed by covering each of upper part and lower part of carbon fiber conductive paper with a layer of epoxy resin fiberglass fabrics, and covering each of the upper layer and lower layer of epoxy resin fiberglass fabrics with a layer of terephthalic acid glycol ester resin by hot pressing. The heating area, temperature, and local temperature can all be applied to the field of building heating. The surface temperature can be adjusted at will from 16° C. to 55° C., and the heating time is fast. Generally, the set temperature can be reached within 30 minutes after starting. However, the application temperature is lower than 55° C., and the application range is limited. More importantly, the low-temperature composite electrothermal material relies on an external temperature controller to control it, and it is likely to cause damage due to temperature superposition in the process of usage-ranging from carbonization of the covering caused by temperature superposition and caused fire hazards.

At present, most of the self-regulating heating materials are mainly formed by mixing carbon powder, high-molecular polymers and conductive filling slurry. Chinese patent application publication CN111925686A discloses a graphene heating ink with PTC (Positive Temperature Coefficient) self-regulating function, which is mainly composed of graphene, supporting material resin, PTC effect material, solvent, thickener, defoamer, and leveling agent. The PTC effect material is used in the graphene heating ink such that the obtained heating diaphragm has the function of self-regulating, reliable structure and convenient usage. A temperature control switch is not needed. However, the conductive network is a chemical conductive network formed by carbon-based powder, conductive filling slurry, and PTC material. Under the condition of the long-term temperature effect, the conductive filling slurry gradually gets fatigues, and the result of the fatigue of the conductive filling slurry is that its conductive network is destroyed and there is a phenomenon of "virtual connection," which leads to breakdown. Further, the PTC material generally fatigues after about 100000 times. When the conductive filling slurry and PTC material are fatigued, the breakdown caused by them directly burns the heating plate, or even causes fire hazards. For example, on Feb. 5, 2017, a fire hazard broke out in Chunxiaodi Zuxintang, Chicheng Street, Tiantai County, Taizhou City, Zhejiang Province, which was caused by the breakdown of electrothermal film, causing a major safety accident.

SUMMARY OF THE INVENTION

In view of the above problems, the present invention discloses a self-regulating far-infrared carbon fiber composite planar electrothermal material and a manufacturing method therefor. The present invention has the technical characteristics described below to solve the existing problems.

In order to overcome the defects of the prior art, an objective of the present invention is to provide a self-regulating far-infrared carbon fiber composite planar electrothermal material and a manufacturing method therefor, the self-regulating far-infrared carbon fiber composite planar electrothermal material utilizes a three-dimensional conductive network with a stable physical structure of carbon fiber conductive paper, which effectively solves the major problems of unstable heating performance, short service life, and fire hazards, those existing in a using process of an existing self-regulating planar heating material. The working temperature of the self-regulating far-infrared carbon fiber composite planar electrothermal material of the present invention is 30° C. to 160° C., and the electrothermal material may be widely applied to the fields of industrial heating, building heating, rehabilitation and physiotherapy, agricultural drying, sterilization, household appliances, rail transit heating, vehicle heating, and special heating.

The self-regulating far-infrared carbon fiber composite planar electrothermal material of the present invention is realized by the following technical solution: the self-regulating far-infrared carbon fiber composite planar electrothermal material comprises two reinforced insulating layers, two insulating layers, two self-regulating layers, and a heating layer, and the material is formed by high-temperature hot pressing, impregnation, and curing, and further comprises a connecting terminal and a power supply lead. The connecting terminal is riveted on copper electrodes at two ends of the self-regulating far-infrared carbon fiber composite planar electrothermal material, and the power supply lead is snap-fitted on a wiring groove of the connecting terminal.

In some embodiment of the present invention, the self-regulating far-infrared carbon fiber composite planar electrothermal material consists of the two reinforced insulating layers, two insulating layers, two self-regulating layers, and the heating layer.

In the self-regulating far-infrared carbon fiber composite planar electrothermal material of the present invention, the upper and lower surfaces of the heating layer are covered with the two self-regulating layers, respectively, the two self-regulating layers are covered with the two insulating layers, respectively, and the two insulating layers are covered with the two reinforced insulating layers, respectively.

In the self-regulating far-infrared carbon fiber composite planar electrothermal material of the present invention, the heating layer is made of carbon fiber conductive paper with a volume resistivity of 0.1 to 6 Ω·cm, and two copper foil strips are fixedly arranged on the two sides of the carbon fiber conductive paper, respectively, and the two copper foil strips are the same length as the carbon fiber conductive paper.

In the self-regulating far-infrared carbon fiber composite planar electrothermal material of the present invention, the length and width of the reinforced insulating layers, the insulating layers, and the self-regulating layers are the same, and the length and width of the heating layer are smaller than those of the reinforced insulating layers, the insulating layers, and the self-regulating layers.

In the self-regulating far-infrared carbon fiber composite planar electrothermal material of the present invention, the self-regulating layers are semi-cured sheets formed by impregnating a cloth material with a self-regulating composite solvent and performing drying and hot pressing. The cloth material is one of non-woven fabrics or fiberglass fabrics. The non-woven fabrics are polyester fiber non-woven fabrics, polypropylene fiber non-woven fabrics, polyamide fiber non-woven fabrics, spandex fiber non-woven fabrics, or acrylic fiber non-woven fabrics, and the fixed weight of the non-woven fabrics is 20 to 100 g/m²; and the fiberglass fabrics are alkali-free fiberglass fabrics or medium-alkali fiberglass fabrics, and the fixed weight of the fiberglass fabrics is 50 to 150 g/m².

In the self-regulating far-infrared carbon fiber composite planar electrothermal material of the present invention, the self-regulating composite solvent is an epoxy resin solution in which thermoplastic polymers are uniformly dispersed. The epoxy resin solution and the thermoplastic polymers are formed by performing uniform mixing according to a weight ratio of 10:(0.5-1). The thermoplastic polymers are formed by performing airflow crushing and mixing on polypropylene powder, polyethylene powder, and polyvinylidene fluoride powder according to a weight ratio of 2:(1-1.5):(0.1-0.3). The epoxy resin solution with the thermoplastic polymers is formed by uniformly mixing a brominated epoxy resin solution, a 6101 epoxy resin solution (also known as Bisphenol A epoxy resin), and a diluent according to a weight ratio of 10:(3-6):(1-0.3), the brominated epoxy resin solution is brominated bisphenol A epoxy resin, brominated phenolic epoxy resin, or dibromopentaerythritol epoxy resin, and the diluent is ethyl acetate, butyl acetate, or acetone.

In the self-regulating far-infrared carbon fiber composite planar electrothermal material of the present invention, the insulating layers are semi-cured sheets formed by impregnating the fiberglass fabrics with the epoxy resin solution and performing drying and hot pressing. The fiberglass fabrics are alkali-free fiberglass fabrics or the medium-alkali fiberglass fabrics, and the fixed weight of the fiberglass fabrics is 150 to 300 g/m². The epoxy resin solution is formed by uniformly mixing the brominated epoxy resin solution, the 6101 epoxy resin solution, and the diluent according to a weight ratio of 10:(3-6):(1-0.3), the brominated epoxy resin solution is brominated bisphenol A epoxy resin, brominated phenolic epoxy resin, or dibromopentaerythritol epoxy resin, and the diluent is ethyl acetate, butyl acetate, or acetone.

In the self-regulating far-infrared carbon fiber composite planar electrothermal material of the present invention, thermoplastic polymer films are used as the reinforced insulating layers, the thermoplastic polymer films are PET (polyethylene terephthalate) films, PBT (Polybutylene Terephthalate) films, PVDF (Polyvinylidene Fluoride) films, or PC (Polycarbonate) films, and the thickness of the thermoplastic polymer films is 20 to 50 μm.

In the self-regulating far-infrared carbon fiber composite planar electrothermal material of the present invention, the temperature of the high-temperature hot pressing, the impregnation, and the curing of the self-regulating far-infrared carbon fiber composite planar electrothermal material is in a range of 140° C. to 180° C., the time for hot pressing is 60 to 180 min, and the hot pressing pressure is 50 to 150 kg/cm².

In the self-regulating far-infrared carbon fiber composite planar electrothermal material of the present invention, the connecting terminal is riveted on the copper electrodes at the two ends of the self-regulating far-infrared carbon fiber composite planar electrothermal material by means of riveting terminals, the connecting terminal is an OT terminal (also known as OT-type terminal connector, see for example, http://www.szanyd.com/product_show.php?id=7), and the T-terminal wiring groove of the OT terminal is configured to snap-fit and fix the power supply lead. The riveting terminals are composed of hollow copper rivets and fastening gaskets.

In the self-regulating far-infrared carbon fiber composite planar electrothermal material of the present invention, the copper electrodes at the two ends of the self-regulating far-infrared carbon fiber composite planar electrothermal material are provided with a group of symmetrical circular holes, and the circular holes on the self-regulating far-infrared carbon fiber composite planar electrothermal material have the same diameter as the hollow copper rivets.

The method for preparing the self-regulating far-infrared carbon fiber composite planar electrothermal material of the present invention comprises the following steps:

Step 1: manufacturing self-regulating layers;

Step 1.1: performing airflow crushing on polypropylene powder, polyethylene powder and polyvinylidene fluoride powder according to a weight ratio to obtain thermoplastic polymers;

Step 1.2: putting the brominated epoxy resin solution, the 6101 epoxy resin solution, and the diluent into the mixer according to the weight ratio for homogenization for the homogenization time of 10 to 30 min, and obtaining the epoxy resin solution after the homogenization;

Step 1.3: putting the thermoplastic polymers obtained in step 1.1 and the epoxy resin solution obtained in step 1.2 into the mixer according to a weight ratio for homogenization for homogenization time of 20 to 45 min at rotating speed of a homogenizer of 800 to 1500 r/min to obtain a self-regulating solvent;

Step 1.4: pouring the self-regulating solvent obtained in step 1.3 into an impregnation pool of an impregnator;

Step 1.5: putting fiberglass fabrics into the impregnator, and starting impregnation;

Step 1.6: drying the fiberglass fabrics impregnated in step 1.5;

Step 1.7: cutting the fiberglass fabrics dried in step 1.6, and sending the cut fiberglass fabrics into a hot press for hot pressing at hot pressing temperature of 80 to 140° C. for hot pressing time of 40 to 120 min at hot pressing pressure of 10 to 80 kg/cm$^2$;

Step 2: manufacturing insulating layers;

Step 2.1: putting the brominated epoxy resin solution, the 6101 epoxy resin solution and the diluent into the mixer according to the weight ratio for homogenization for the homogenization time of 10 to 30 min, and obtaining the epoxy resin solution after the homogenization;

Step 2.2: pouring the epoxy resin solution into the impregnation pool of the impregnator;

Step 2.3: putting the fiberglass fabrics into the impregnator, and starting the impregnation;

Step 2.4: drying the fiberglass fabrics impregnated in step 2.3;

Step 2.5: cutting the fiberglass fabrics dried in step 2.5, and sending the cut fiberglass fabrics into the hot press for the hot pressing at the hot pressing temperature of 120 to 140° C. for the hot pressing time of 60 to 120 min at the hot pressing pressure of 30 to 120 kg/cm$^2$;

Step 3: manufacturing a heating layer;

Step 3.1: cutting conductive paper according to required size;

Step 3.2: tying copper electrodes on two sides of the cut conductive paper with a sewing machine;

Step 4: manufacturing reinforced insulating layers;

Step 5: cutting the self-regulating layers;

Step 6: cutting the insulating layers;

Step 7: sequentially laying the reinforced insulating layer, the insulating layer, the self-regulating layer, the heating layer, the self-regulating layer, the insulating layer and the reinforced insulating layer on a steel plate flat from bottom to top to obtain a self-regulating far-infrared carbon fiber composite planar electrothermal material blank, and placing a steel plate on the blank;

Step 8: repeating step 7, where the steel plate on the top of the blank in step 7 is sequentially layered with the reinforced insulating layer, the insulating layer, the self-regulating layer, the heating layer, the self-regulating layer, the insulating layer and the reinforced insulating layer for another blank, and a further steel plate is placed on the blank, and the process is repeated for twice to ten times;

Step 9: placing the multilayer self-regulating far-infrared carbon fiber composite planar electrothermal material blank manufactured in step 8 on working tables of the hot press in parallel;

Step 10: placing the multilayer self-regulating far-infrared carbon fiber composite planar electrothermal material blanks on all layers of working tables of the hot press full, starting the hot press for the hot pressing, and obtaining the self-regulating far-infrared carbon fiber composite planar electrothermal material sheets from the blanks between the steel plates after the hot pressing is finished;

Step 11: cutting the self-regulating far-infrared carbon fiber composite planar electrothermal material sheets obtained in step 10 according to product requirements;

Step 12: punching holes on two copper electrode edges of the self-regulating far-infrared carbon fiber composite planar electrothermal material sheets obtained in step 11, and grinding copper electrodes around the holes with a grinder;

Step 13: crimping a power supply lead on the OT terminal with crimping pliers;

Step 14: riveting the wiring terminal obtained in step 13 on the self-regulating far-infrared carbon fiber composite planar electrothermal material sheets obtained in step 12; and Step 15: sealing the riveted terminal and obtaining the self-regulating far-infrared carbon fiber composite planar electrothermal material.

Compared with the existing technology, the self-regulating far-infrared carbon fiber composite planar electrothermal material and the manufacturing method therefor of the present invention have the following advantages and positive effects.

The self-regulating far-infrared carbon fiber composite planar electrothermal material of the present invention mainly uses far-infrared radiation for heat transfer, the electrothermal conversion efficiency may reach 99%, and electrothermal radiation conversion efficiency may reach 50%, such that heat transfer efficiency is high, and the electrothermal material is an advanced energy-saving material.

The self-regulating far-infrared carbon fiber composite planar electrothermal material of the present invention has a PTC effect, may perform self-regulating, may avoid safety accidents caused by excess temperature or temperature superposition in a using process, and may also greatly avoid energy waste caused by temperature overload, etc. Compared with similar heating materials, the self-regulating far-infrared carbon fiber composite planar electrothermal material may save energy by at least 30% or above.

A heating element of the self-regulating far-infrared carbon fiber composite planar electrothermal material of the present invention is the three-dimensional conductive network built in short carbon fiber, and a conductive path thereof is a physical structure built in the short carbon fiber, which has the characteristics of a stable structure. The inspection service number of the national infrared and industrial electrothermal product quality supervision and testing institute is (2020)-WT-HW-01113, and service life thereof may reach 100000 hours.

The self-regulating far-infrared carbon fiber composite planar electrothermal material of the present invention may be combined into a plurality of heating materials with different powers and temperatures according to power and specification requirements to satisfy different requirements.

The self-regulating far-infrared carbon fiber composite planar electrothermal material of the present invention is safe to use, the whole surface is an electronic path under general voltage, and the current density is extremely small, such that the self-regulating far-infrared carbon fiber composite planar electrothermal material is harmless to human bodies.

Reference numbers in the figures refer to the following structure: 1—heating layer; 2—self-regulating layer; 3—insulating layer; 4—reinforced insulating layer; 5—copper electrode.

DETAILED DESCRIPTIONS OF THE INVENTION

Figure 1:
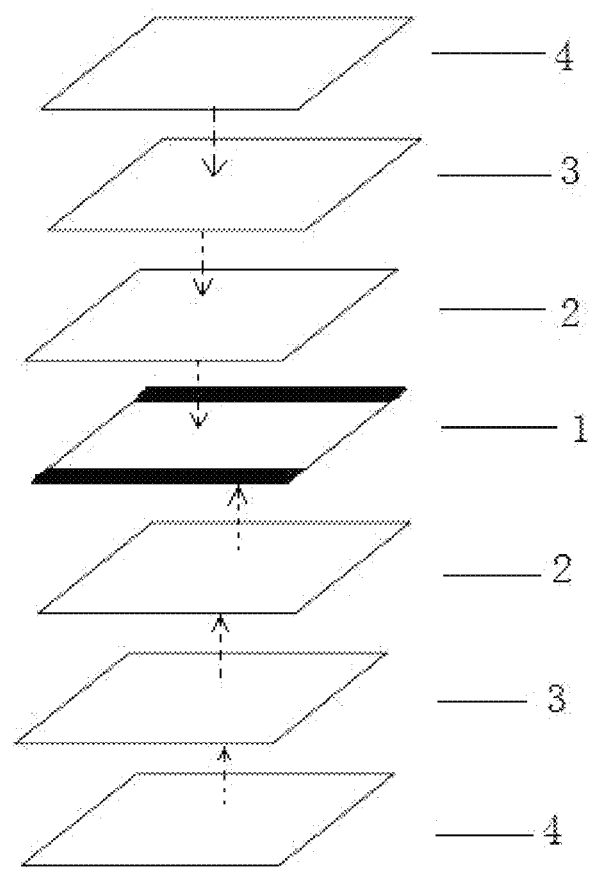
FIG. 1 shows the structure of the self-regulating far-infrared carbon fiber composite planar electrothermal material of the present invention.
Figure 2:
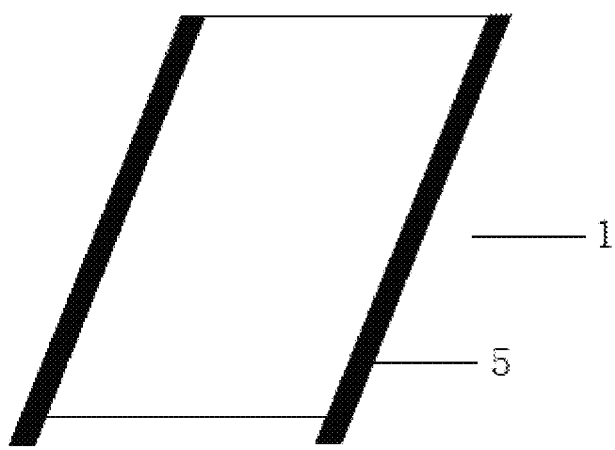
FIG. 2 shows the structure of the heating layer in the self-regulating far-infrared carbon fiber composite planar electrothermal material of the present invention.

As shown in FIGS. 1 and 2, the self-regulating far-infrared carbon fiber composite planar electrothermal material of the present invention comprises two reinforced insulating layers 4, two insulating layers 3, two self-regulating layers 2, and a heating layer 1, which is formed by high-temperature hot pressing, impregnation, and curing, and further comprises a connecting terminal and a power supply lead. The connecting terminal is riveted on copper electrodes 5 at two ends of the self-regulating far-infrared carbon fiber composite planar electrothermal material, and the power supply lead is snap-fitted on a wiring groove of the connecting terminal.

The upper surface and the lower surface of the heating layer 1 are respectively covered with the two self-regulating layers 2, the upper layers and lower layers of the two self-regulating layers 2 are respectively covered with the two insulating layers 3, and the upper layers and lower layers of the two insulating layers 3 are respectively covered with the two reinforced insulating layers 4.

The heating layer 1 is made of carbon fiber conductive paper with a volume resistivity of 0.1 to 6 $\Omega \cdot cm$. The two copper foil strips are fixedly arranged on two sides of the carbon fiber conductive paper, respectively, and the two copper foil strips are the same length as the carbon fiber conductive paper. The carbon fiber conductive paper belongs to a conductive mechanism of a "conductive channel" which mainly depends on a three-dimensional conductive network built in short carbon fiber. Factors affecting conductivity thereof comprise the number of contacts, contact resistance, and gap size, therefore, the conductivity thereof may be determined by adjusting the carbon fiber content and fixed weight of the paper when manufacturing the carbon fiber conductive paper. In the case of carbon fibers with the same length and diameter, the higher the carbon fiber content, the smaller the volume resistivity of the conductive paper, and vice versa. In the case of the same carbon fiber content, the volume resistivity of the conductive paper is constant, and the greater the fixed weight of the conductive paper, the smaller resistance thereof and the better the conductivity thereof. The conductivity of the conductive paper is calculated by the following formula:

Volume resistivity=cross sectional area of conductive paper/distance between copper electrodes*resistance value.

The length and width of the reinforced insulating layers 4, the insulating layers 3, and the self-regulating layers 2 are the same, and the length and width of the heating layer 1 are smaller than those of the reinforced insulating layers 4, the insulating layers 3, and the self-regulating layers 2.

The self-regulating layers 2 are semi-cured sheets formed by impregnating a cloth material with a self-regulating composite solvent and performing drying and hot pressing, the cloth material are non-woven fabrics or fiberglass fabrics; the non-woven fabrics are polyester fiber non-woven fabrics, polypropylene fiber non-woven fabrics, polyamide fiber non-woven fabrics, spandex fiber non-woven fabrics, or acrylic fiber non-woven fabrics, and the fixed weight of the non-woven fabrics is 20 to 100 $g/m^2$; and the fiberglass fabrics are alkali-free fiberglass fabrics or medium-alkali fiberglass fabrics, and the fixed weight of the fiberglass fabrics is 50 to 150 $g/m^2$.

The self-regulating composite solvent is an epoxy resin solution in which thermoplastic polymers are uniformly dispersed. The epoxy resin solution and the thermoplastic polymers are formed by performing uniform mixing according to a weight ratio of 10:(0.5-1). The thermoplastic polymers are formed by performing airflow crushing and mixing on polypropylene powder, polyethylene powder, and polyvinylidene fluoride powder according to a weight ratio of 2:(1-1.5):(0.1-0.3). The epoxy resin solution with the thermoplastic polymers is formed by uniformly mixing a brominated epoxy resin solution, a 6101 epoxy resin solution, and a diluent according to a weight ratio of 10:(3-6):(1-0.3), the brominated epoxy resin solution is brominated bisphenol A epoxy resin, brominated phenolic epoxy resin, or dibromopentaerythritol epoxy resin, and the diluent is ethyl acetate, butyl acetate, or acetone. A heating carrier of the self-regulating far-infrared carbon fiber composite planar electrothermal material is mainly the three-dimensional conductive network built in the short carbon fiber in the carbon fiber conductive paper. The carbon fiber conductive paper itself is in a fluffy structure, a conductive network thereof built in the carbon fibers is not compact, and therefore, hot pressing compounding treatment is needed. When the carbon fiber conductive paper is compounded with epoxy materials, the greater the pressure, the more compact the conductive network built in the short carbon fiber in the conductive paper. During the hot pressing treatment, the conductive paper is completely impregnated with the epoxy resin of the self-regulating layers 2 and the insulating layers 3, such that the conductive network built in the short carbon fiber in the conductive paper is solidified and shaped under the pressure. The carbon fiber conductive paper is the conductive mechanism of the "conductive channel," and during hot pressing, the thermoplastic polymers in the self-regulating layers 2 are also compounded with the epoxy resin into the carbon fiber conductive paper. When the temperature of the self-regulating far-infrared carbon fiber composite planar electrothermal material reaches the expansion coefficient temperature of the thermoplastic polymers, the volume of the thermoplastic polymers expands, which causes the conductive channel of the three-dimensional conductive network of the carbon fiber conductive paper to be slowly separated, and the resistance is increased. The powder of the thermoplastic polymers made of polypropylene powder, polyethylene powder, and polyvinylidene fluoride powder has a good expansion coefficient, and a temperature limit may be designed according to different application fields. Because the conductive network of the carbon fibers is a physical network built in the short carbon fiber, stability thereof is good. When the polymers expand, the number of contacts of the conductive channel built between the carbon fibers in the conductive paper decreases, such that excess temperature is avoided.

The insulating layers 3 are semi-cured sheets formed by impregnating the fiberglass fabrics with the epoxy resin solution and performing drying and hot pressing. The fiberglass fabrics are alkali-free fiberglass fabrics or the medium-alkali fiberglass fabrics, and the fixed weight of the fiberglass fabrics is 150 to 300 $g/m^2$. The epoxy resin solution is formed by uniformly mixing the brominated epoxy resin solution, the 6101 epoxy resin solution, and the diluent according to the weight ratio of 10:(3-6):(1-0.3), the brominated epoxy resin solution is brominated bisphenol A epoxy resin, brominated phenolic epoxy resin, or dibromopentaerythritol epoxy resin, and the diluent is ethyl acetate, butyl acetate, or acetone.

Thermoplastic polymer films are used as the reinforced insulating layers 4, the thermoplastic polymer films are PET films, PBT films, PVDF films and PC films, and thickness of the thermoplastic polymer films is 20 to 50 μm.

The temperature of the high-temperature hot pressing, the impregnation and the curing of the self-regulating far-infrared carbon fiber composite planar electrothermal material is in a range of 140° C. to 180° C., the time for hot pressing is 60 to 180 min, and the hot pressing pressure is 50 to 150 kg/cm².

The connecting terminal is riveted on the copper electrodes 5 at the two ends of the self-regulating far-infrared carbon fiber composite planar electrothermal material, the connecting terminal is an OT terminal, and the T-terminal wiring groove of the OT terminal is configured to snap-fit and fix the power supply lead. The riveting terminals are composed of hollow copper rivets and fastening gaskets.

The copper electrodes 5 at the two ends of the self-regulating far-infrared carbon fiber composite planar electrothermal material are provided with a group of symmetrical circular holes, and the circular holes on the self-regulating far-infrared carbon fiber composite planar electrothermal material have the same diameter as the hollow copper rivets.

The method for preparing the self-regulating far-infrared carbon fiber composite planar electrothermal material of the present invention comprises the following steps:

Step 1: manufacturing self-regulating layers;

Step 1.1: performing airflow crushing on polypropylene powder, polyethylene powder and polyvinylidene fluoride powder according to a weight ratio to obtain thermoplastic polymers;

Step 1.2: putting the brominated epoxy resin solution, the 6101 epoxy resin solution and the diluent into the mixer according to the weight ratio for homogenization for the homogenization time of 10 to 30 min, and obtaining the epoxy resin solution after the homogenization;

Step 1.3: putting the thermoplastic polymers obtained in step 1.1 and the epoxy resin solution obtained in step 1.2 into the mixer according to a weight ratio for homogenization for homogenization time of 20 to 45 min at rotating speed of a homogenizer of 800 to 1500 r/min to obtain a self-regulating solvent;

Step 1.4: pouring the self-regulating solvent obtained in step 1.3 into an impregnation pool of an impregnator;

Step 1.5: putting fiberglass fabrics into the impregnator, and starting impregnation;

Step 1.6: drying the fiberglass fabrics impregnated in step 1.5;

Step 1.7: cutting the fiberglass fabrics dried in step 1.6, and sending the cut fiberglass fabrics into a hot press for hot pressing at hot pressing temperature of 80 to 140° C. for hot pressing time of 40 to 120 min at hot pressing pressure of 10 to 80 kg/cm²;

Step 2: manufacturing insulating layers;

Step 2.1: putting the brominated epoxy resin solution, the 6101 epoxy resin solution, and the diluent into the mixer according to the weight ratio for homogenization for the homogenization time of 10 to 30 min, and obtaining the epoxy resin solution after the homogenization;

Step 2.2: pouring the epoxy resin solution into the impregnation pool of the impregnator;

Step 2.3: putting the fiberglass fabrics into the impregnator, and starting the impregnation;

Step 2.4: drying the fiberglass fabrics impregnated in step 2.3;

Step 2.5: cutting the fiberglass fabrics dried in step 2.5, and sending the cut fiberglass fabrics into the hot press for the hot pressing at the hot pressing temperature of 120 to 140° C. for the hot pressing time of 60 to 120 min at the hot pressing pressure of 30 to 120 kg/cm²;

Step 3: manufacturing a heating layer;

Step 3.1: cutting conductive paper according to required size;

Step 3.2: tying copper electrodes on two sides of the cut conductive paper with a sewing machine;

Step 4: manufacturing reinforced insulating layers;

Step 5: cutting the self-regulating layers;

Step 6: cutting the insulating layers;

Step 7: sequentially laying the reinforced insulating layer, the insulating layer, the self-regulating layer, the heating layer, the self-regulating layer, the insulating layer and the reinforced insulating layer on a steel plate flat from bottom to top to obtain a self-regulating far-infrared carbon fiber composite planar electrothermal material blank, and placing a steel plate on the blank;

Step 8: repeating step 7 for twice-ten times;

Step 9: placing the multilayer self-regulating far-infrared carbon fiber composite planar electrothermal material blank manufactured in step 8 on working tables of the hot press in parallel;

Step 10: repeating step 8 and step 9 until the multilayer self-regulating far-infrared carbon fiber composite planar electrothermal material blank is placed on all layers of working tables of the hot press full, starting the hot press for the hot pressing, and obtaining a self-regulating far-infrared carbon fiber composite planar electrothermal material sheet after the hot pressing is finished;

Step 11: cutting the self-regulating far-infrared carbon fiber composite planar electrothermal material sheet obtained in step 10 according to product requirements;

Step 12: punching holes on two copper electrode edges of the self-regulating far-infrared carbon fiber composite planar electrothermal material sheet obtained in step 11, and grinding copper electrodes around the holes with a grinder;

Step 13: crimping a power supply lead on the OT terminal with crimping pliers;

Step 14: riveting the wiring terminal obtained in step 13 on the self-regulating far-infrared carbon fiber composite planar electrothermal material sheet obtained in step 12; and Step 15: sealing the riveted terminal and obtaining the self-regulating far-infrared carbon fiber composite planar electrothermal material.

The specific examples of the present invention have been described in detail above, but the present invention is not limited to the specific examples described above, which are just examples. It would be obvious to those skilled in the art that any equivalent modifications and substitutions to the system are also within the scope of the present invention. Therefore, all equivalent transformations and modifications made without departing from the spirit and principle of the present invention should fall within the scope of the present invention.

We claim:

1. A self-regulating far-infrared carbon fiber composite planar electrothermal material, comprising
   two reinforced insulating layers,
   two insulating layers,
   two self-regulating layers,
   a heating layer comprising an upper surface and a lower surface,
   a connecting terminal, and
   a power supply lead,
   wherein the reinforced insulating layers, the insulating layers, the self-regulating layers, and the heating layer form the self-regulating far-infrared carbon fiber composite planar electrothermal material by high-temperature hot pressing, impregnation, and curing, the connecting terminal is riveted on copper electrodes at two ends of the self-regulating far-infrared carbon fiber composite planar electrothermal material, the power supply lead is snap-fitted on a wiring groove of the connecting terminal, the self-regulating layers are semi-cured sheets formed by impregnating a cloth material with a self-regulating composite solvent and performing drying and hot pressing, the cloth material is a non-woven fabric or a fiberglass fabric, the non-woven fabric is a polyester fiber non-woven fabric, a polypropylene fiber non-woven fabric, a polyamide fiber non-woven fabric, a spandex fiber non-woven fabric, or an acrylic fiber non-woven fabric, and a fixed weight of the non-woven fabric is 20 to 100 g/m$^2$;

the fiberglass fabric is an alkali-free fiberglass fabric or a medium-alkali fiberglass fabric, and a fixed weight of the fiberglass fabric is 50 to 150 g/m$^2$;

the self-regulating composite solvent is an epoxy resin solution where thermoplastic polymers are uniformly dispersed, wherein the epoxy resin solution and the thermoplastic polymers are uniformly mixed at a weight ratio of 10:(0.5-1), the thermoplastic polymers are formed by performing airflow crushing and mixing on polypropylene powder, polyethylene powder, and polyvinylidene fluoride powder at a weight ratio of 2:(1-1.5):(0.1-0.3), the epoxy resin solution is formed by uniformly mixing a brominated epoxy resin solution, a 6101 epoxy resin solution, and a diluent at a weight ratio of 10:(3-6):(1-0.3), wherein the brominated epoxy resin solution is a brominated bisphenol A epoxy resin, a brominated phenolic epoxy resin, or a dibromopentaerythritol epoxy resin, and the diluent is ethyl acetate, butyl acetate, or acetone.

2. The self-regulating far-infrared carbon fiber composite planar electrothermal material according to claim 1, wherein the upper and lower surfaces of the heating layer are covered with the two self-regulating layers, respectively, the two self-regulating layers are covered with the two insulating layers, respectively, and the two insulating layers are covered with the two reinforced insulating layers, respectively.

3. The self-regulating far-infrared carbon fiber composite planar electrothermal material according to claim 1, wherein the heating layer is made of carbon fiber conductive paper, a volume resistivity of the carbon fiber conductive paper is 0.1 to 6 Ω·cm, two copper foil strips are fixedly arranged on two sides of the carbon fiber conductive paper, respectively, and the two copper foil strips are at same length as the carbon fiber conductive paper.

4. The self-regulating far-infrared carbon fiber composite planar electrothermal material according to claim 1, wherein length and width of the reinforced insulating layers, the insulating layers, and the self-regulating layers are same, and a length and width of the heating layer are smaller than those of the reinforced insulating layers, the insulating layers, and the self-regulating layers.

5. The self-regulating far-infrared carbon fiber composite planar electrothermal material according to claim 1, wherein the insulating layers are semi-cured sheets formed by impregnating the fiberglass fabrics with the epoxy resin solution, and performing drying and hot pressing, the fiberglass fabrics are alkali-free fiberglass fabrics or medium-alkali fiberglass fabrics, and a fixed weight of the fiberglass fabrics is 150 to 300 g/m$^2$;

the epoxy resin solution is formed by uniformly mixing the brominated epoxy resin solution, the 6101 epoxy resin solution, and the diluent at a weight ratio of 10:(3-6):(1-0.3), the brominated epoxy resin solution is brominated bisphenol A epoxy resin, brominated phenolic epoxy resin, or dibromopentaerythritol epoxy resin, and the diluent is ethyl acetate, butyl acetate, or acetone.

6. The self-regulating far-infrared carbon fiber composite planar electrothermal material according to claim 1, wherein thermoplastic polymer films are used as the reinforced insulating layers, and the thermoplastic polymer films are PET films, PBT films, PVDF films, or PC films, and a thickness of the thermoplastic polymer films is 20 to 50 μm.

7. The self-regulating far-infrared carbon fiber composite planar electrothermal material according to claim 1, wherein a temperature for the high-temperature hot pressing, the impregnation, and the curing of the self-regulating far-infrared carbon fiber composite planar electrothermal material is 140° C. to 180° C., a time for hot pressing is 60 to 180 min, and a hot pressing pressure is 50 to 150 kg/cm$^2$.

8. The self-regulating far-infrared carbon fiber composite planar electrothermal material according to claim 1, wherein the connecting terminal is riveted on the copper electrodes at the two ends of the self-regulating far-infrared carbon fiber composite planar electrothermal material by means of riveting terminals, the connecting terminal is an OT terminal, T-terminal wiring groove of the OT terminal is configured to snap-fit and fix the power supply lead, and the riveting terminals are composed of hollow copper rivets and fastening gaskets.

9. The self-regulating far-infrared carbon fiber composite planar electrothermal material according to claim 8, wherein the copper electrodes at the two ends of the self-regulating far-infrared carbon fiber composite planar electrothermal material are provided with a group of symmetrical circular holes, and the circular holes on the self-regulating far-infrared carbon fiber composite planar electrothermal material have the same diameter as the hollow copper rivets.

10. A method for manufacturing the self-regulating far-infrared carbon fiber composite planar electrothermal material as described in claim 1, comprising:

(1) manufacturing self-regulating layers by the following steps of performing airflow crushing on polypropylene powder, polyethylene powder, and polyvinylidene fluoride powder at a weight ratio to obtain thermoplastic polymers, putting a brominated epoxy resin solution, a 6101 epoxy resin solution, and a diluent into a mixer at a weight ratio and homogenizing for 10 to 30 min to obtain a first epoxy resin solution, putting the thermoplastic polymers and the first epoxy resin solution into a mixer at a weight ratio and homogenizing in a homogenizer for 20 to 45 min at a rotating speed 800 to 1500 r/min to obtain a self-regulating solvent, pouring the self-regulating solvent into an impregnation pool of an impregnator, putting fiberglass fabrics into the impregnator and starting impregnation to obtain an impregnated fiberglass fabric, drying the impregnated fiberglass fabrics to obtained dried fiberglass fabric, cutting the dried fiberglass fabric to obtain cut fiberglass fabric, and sending the cut fiberglass fabric into a hot press for hot pressing at a temperature of 80° C. to 140° C. for 40 to 120 min at a pressure of 10 to 80 kg/cm²;

(2) manufacturing insulating layers by the following steps of putting the brominated epoxy resin solution, the 6101 epoxy resin solution, and the diluent into the mixer at a weight ratio and homogenizing for 10 to 30 min to obtain a second epoxy resin solution, pouring the second epoxy resin solution into an impregnation pool of an impregnator, putting fiberglass fabrics into the impregnator and starting the impregnation to obtain a second impregnated fiberglass fabric, drying the second impregnated fiberglass fabrics to obtain a second dried fiberglass fabric, cutting the second dried fiberglass fabrics to obtain a second cut fiberglass fabrics, and sending the second cut fiberglass fabrics into a hot press for the hot pressing at a temperature of 120° C. to 140° C. for 60 to 120 min at a hot pressing pressure of 30 to 120 kg/cm²;

(3) manufacturing a heating layer by the steps of cutting a conductive paper according to a required size, tying copper electrodes on two sides of the conductive paper with a sewing machine;

(4) manufacturing reinforced insulating layers;

(5) cutting self-regulating layers;

(6) cutting the insulating layers;

(7) sequentially laying on a first steel plate flat from bottom to top, the reinforced insulating layer, the insulating layer, the self-regulating layer, the heating layer, the self-regulating layer, the insulating layer, and the reinforced insulating layer, to obtain a blank of the self-regulating far-infrared carbon fiber composite planar electrothermal material, and placing a second steel plate on the blank;

(8) repeating step 7 for 2 to 10 times, where the second steel plate of step 7 is sequentially layered with, bottom to top, the reinforced insulating layer, the insulating layer, the self-regulating layer, the heating layer, the self-regulating layer, the insulating layer, and the reinforced insulating layer, to obtain a blank, and a third steel plate, and the third steel plate serves as the bottom steel plate for a next blank;

(9) placing the multilayer self-regulating far-infrared carbon fiber composite planar electrothermal material blanks manufactured in step 8 on working tables of the hot press in parallel;

(10) placing the multilayer self-regulating far-infrared carbon fiber composite planar electrothermal material blanks on all layers of working tables of the hot press full, starting the hot press for the hot pressing and obtaining self-regulating far-infrared carbon fiber composite planar electrothermal material sheets between the steel plates after the hot pressing is finished;

(11) cutting the self-regulating far-infrared carbon fiber composite planar electrothermal material sheets obtained in step (10) according to product requirements;

(12) punching holes on two copper electrode edges of the self-regulating far-infrared carbon fiber composite planar electrothermal material sheets obtained in step 11, and grinding copper electrodes around the holes with a grinder;

(13) crimping a power supply lead on the OT terminal with crimping pliers;

(14) riveting the wiring terminal obtained in step (13) on the self-regulating far-infrared carbon fiber composite planar electrothermal material sheets obtained in step (12); and

(15) sealing the riveted terminal and obtaining the self-regulating far-infrared carbon fiber composite planar electrothermal material of claim 1.

\* \* \* \* \*